L. E. PARROTT.
PNEUMATIC SHOCK ABSORBER.
APPLICATION FILED OCT. 16, 1912.
1,066,313.
Patented July 1, 1913.
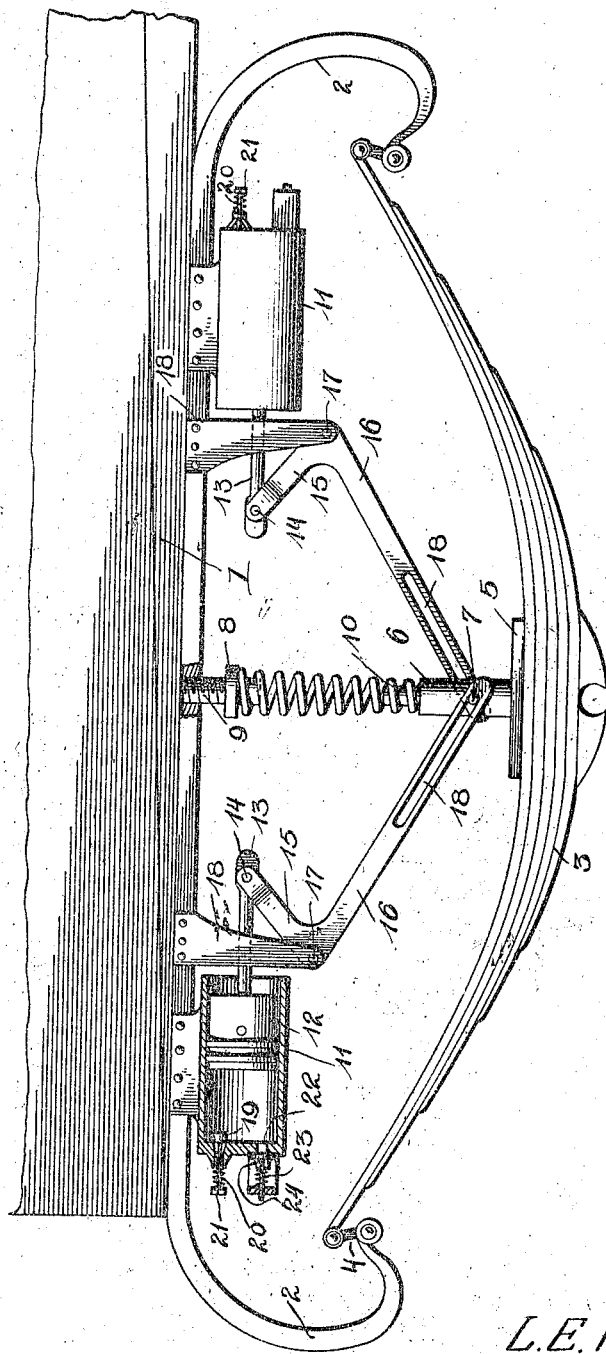
Witnesses
Inventor
L. E. Parrott
By Victor J. Evans
Attorney

UNITED STATES PATENT OFFICE.

LLOYD E. PARROTT, OF TOPINABEE, MICHIGAN.

PNEUMATIC SHOCK-ABSORBER.

1,066,313.

Specification of Letters Patent. Patented July 1, 1913.

Application filed October 16, 1912. Serial No. 726,071.

*To all whom it may concern:*

Be it known that I, LLOYD E. PARROTT, a citizen of the United States, residing at Topinabee, in the county of Cheboygan and State of Michigan, have invented new and useful Improvements in Pneumatic Shock-Absorbers, of which the following is a specification.

This invention relates to pneumatic spring checks or shock absorbers, the object of the invention being to provide a simple and reliable device of the class referred to, which is especially designed for use upon the springs of automobiles, motor trucks, and all classes of self-propelled vehicles.

One of the main objects of the invention is to compactly arrange the pneumatic check mechanism within the ordinary confines or boundaries of the spring and the frame with which the spring is connected, so that the appearance of the machine will not be detracted from, nor any projecting parts left.

With the above and other objects in view, the invention consists in the construction, combination and arrangement of parts, as will be hereinafter more fully described, illustrated in the accompanying drawings, and pointed out in the claims hereunto appended.

The accompanying drawing represents the pneumatic check device of this invention, the device being shown applied to the spring and frame, and parts being broken away to better illustrate the construction involved.

Referring to the drawings, 1 designates a yoke designed to be secured to the frame of a vehicle. The yoke 1 is provided with the downwardly extending and hook-shaped end portions 2, to which the opposite extremities of the ordinary leaf spring 3 are connected, the connections between the extremities of the spring and the extremities of the downwardly extending arms 2 being shown as consisting of pivotal and swinging links 4, this being the usual construction employed in automobiles.

5 designates the clip which usually connects the center of the spring 3 and the axle of the machine. In carrying out this invention, the clip 5 is provided with an upstanding post 6 having a laterally projecting pin 7 thereon. Above the post 6 and in vertical alinement therewith is another post 8 which is threaded, as shown at 9, to render the same adjustable through a threaded opening in the yoke 1. A bumper spring 10 is interposed between the posts 6 and 8, as shown, to sustain the shocks imparted to the machine and wheels, and by making the post 8 adjustable, the tension of the bumper spring 10 may be correspondingly adjusted to suit any variation in the loads imposed thereon.

Secured to the yoke 1, about equi-distant from the center thereof, are two air cylinders 11, in which are arranged reciprocatory pistons 12, the connecting rods 13 of which extend toward the center of the device, where they connect pivotally, at 14, to the shorter arms 15 of a pair of bell crank levers, the longer arms of which are designated at 16. These levers are pivotally supported, at 17, on brackets 18 rigidly connected to the yoke 1, and extending downwardly therefrom. The longer arms 16 of the bell crank levers are provided with longitudinal slots 18 which receive the pin 7 extending laterally from the post 6, as hereinabove described.

It will be observed that when there is a sudden thrust downward on the body of the vehicle, the clip 5 moving toward the body of the vehicle carries the longer arms of the bell crank levers upward, thereby moving the pistons 12 within their respective cylinders, which are arranged horizontally beneath the yoke 1, so as to be out of the way, and so that the spring 3 will not come in contact therewith.

In the outer end of each cylinder is arranged an inlet relief valve 19 having a closing spring 20, the tension of which is adjustable by means of a nut 21. Each cylinder is also provided in its outer end with an outlet relief valve 22 controlled by a spring 23, the tension of which is adjustable by means of a nut 24.

By adjusting the inlet and outlet relief valves, the resistance to the back and forth movements of the pistons may be nicely regulated to suit the loads imposed upon the springs.

From the foregoing description, it will be seen that the sudden shocks imparted to the machine and the wheels thereof are absorbed by the pneumatic check mechanism which acts in conjunction with the usual supporting spring, preventing said spring from acting too suddenly, and also relieving the stress thrown on the spring, when the wheels drop suddenly into a deep rut or strike a serious obstruction. All of the mechanism of the spring check device is located between the spring and the yoke to which the spring is connected, and in such manner as to prevent any interference therewith and injury thereto, when sudden shocks occur.

What is claimed is:

1. A pneumatic spring check device adapted for attachment as a whole to a vehicle, comprising in combination, a yoke having downwardly projecting end portions, a leaf spring terminally supported by said end portions of the yoke, a clip secured to the central part of the spring, oppositely arranged horizontal cylinders attached to the yoke and provided with air valves, pistons in said cylinders, bell-crank levers having a sliding connection with said clip, and rods connecting the bell-crank levers and pistons.

2. A pneumatic spring check device adapted for attachment as a whole to a vehicle, comprising in combination, a yoke having downwardly projecting end portions, a leaf spring terminally supported by said end portions of the yoke, a clip secured to the central part of the spring, oppositely arranged cylinders attached to the yoke and extending horizontally, bell crank levers having a sliding connection with said clip, rods connecting the elbow levers and pistons, posts on the spring clip and yoke, and a bumper spring connecting said posts, one of said posts being adjustable to regulate the tension of the bumper spring.

In testimony whereof I affix my signature in presence of two witnesses.

LLOYD E. PARROTT.

Witnesses:
 GEO. S. OSTRANDER,
 ALCID PRATT.